G. CHRISTIANS.
GAS GENERATOR.
APPLICATION FILED OCT. 7, 1911.
1,070,409.
Patented Aug. 19, 1913.
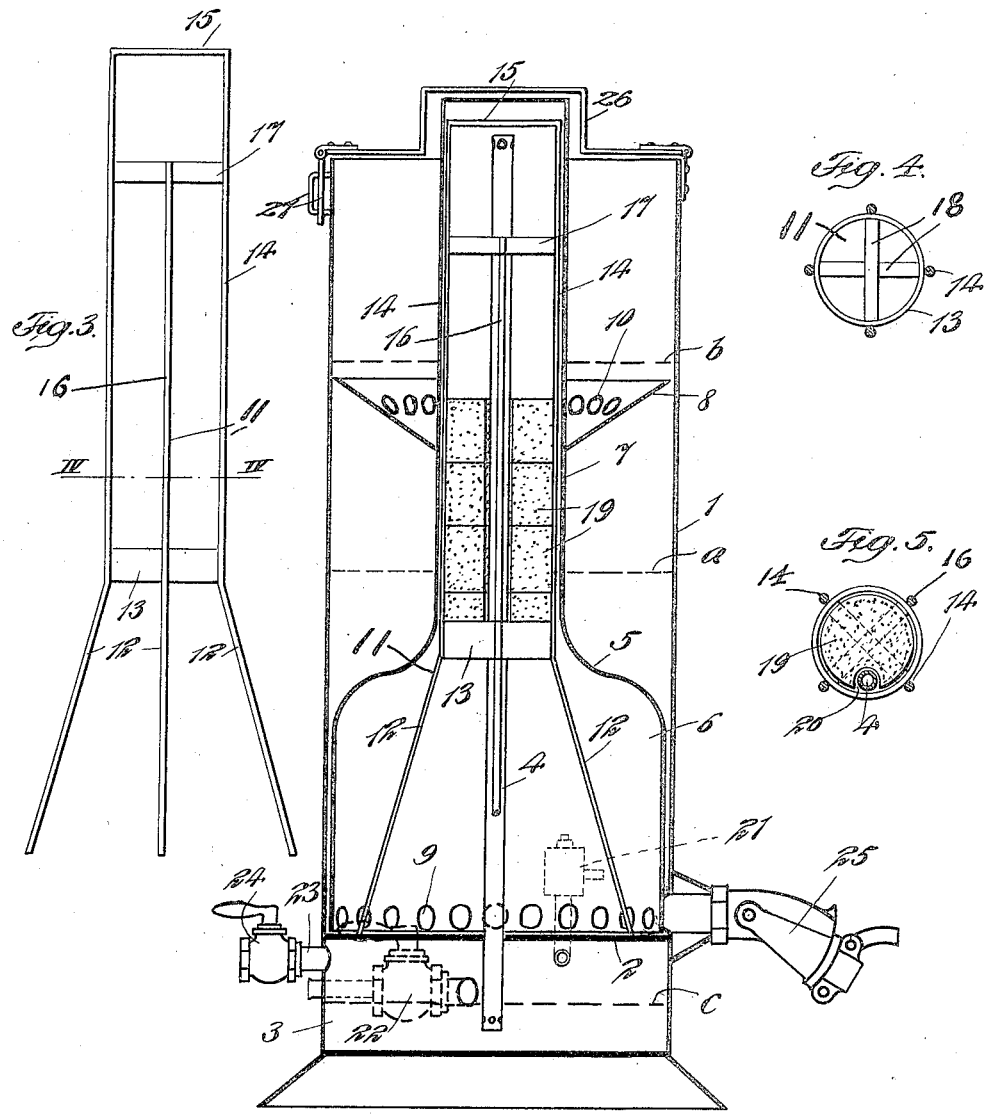
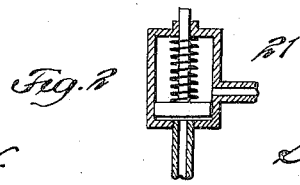
WITNESSES:
F. R. Miller
L. Maguire
INVENTOR
George Christians
BY
David Davis
ATTORNEYS

UNITED STATES PATENT OFFICE.

GEORGE CHRISTIANS, OF FREEPORT, NEW YORK.

GAS-GENERATOR.

1,070,409.  Specification of Letters Patent.  Patented Aug. 19, 1913.

Application filed October 7, 1911. Serial No. 653,390.

*To all whom it may concern:*

Be it known that I, GEORGE CHRISTIANS, a citizen of the United States, residing at Freeport, county of Queens, and State of New York, have invented certain new and useful Improvements in Gas-Generators, of which the following is a specification.

This invention relates to new and useful improvements in apparatus for generating gas from a suitable chemical, such as calcium carbid in blocks, by the contact therewith of a suitable fluid or liquid.

One of the main objects of the invention is to provide a device simple in construction and, therefore, inexpensive to manufacture, and which will be strong and durable; require practically no regulation, and which will be very easily dismantled and cleaned and readily assembled again for operation.

Another object of the invention is to provide a generator in which the capacity for storing the gas-producing chemical will be considerable and in which the gas storage capacity will be slight and to so arrange the apparatus that the generation of gas will be automatically regulated and controlled by the gas at a very low pressure.

Other objects and advantages of the invention will appear hereinafter.

In the drawings, Figure 1 is a vertical central sectional view of the generator complete; Fig. 2 a detail sectional view of a pressure regulating safety valve; Fig. 3 a detail side elevation of the holding rack; Fig. 4 a horizontal sectional view thereof; and Fig. 5 a detail plan view of one of the chemical blocks from which the gas is generated.

Referring to the various parts by numerals, 1 designates the main generator tank which is open at its upper end and is provided near its lower end with a false bottom 2 spaced a suitable distance above the main bottom of the tank and forming the gas storage and washing chamber 3. Extending from this washing chamber upwardly through the false bottom and to the top of the main tank is a gas pipe 4, said pipe extending close to the main bottom of the tank and being open at its upper and lower ends. Water or other suitable washing liquid is placed in the washing chamber, the said water submerging the lower end of the pipe 4 and extending preferably to the water level indicated by the dotted line *c*. In the main tank is arranged a removable cap 5 which is formed at its lower end with the enlarged dome part 6 open at its lower end and substantially equal in diameter to the interior of the tank 1. From the top of this dome part extends a central contracted vertical gas chamber 7, said chamber being of substantially uniform diameter throughout and surrounding and inclosing the upper portion of the gas pipe 4, the upper end of said chamber being closed so that gas rising therein will enter the upper end of the gas pipe 4, and will be by said pipe delivered into the washing chamber below the level of the washing liquid therein. This gas chamber also forms a chamber for the gas generating material. Secured to this gas chamber is a plate 8 substantially equal in diameter to the interior of the tank 1, said plate forming a centering and guiding means for the cap 5 to hold said cap centrally in the tank and to prevent any undue lateral vibration or movement of said cap during the operation of the apparatus or during the removal of the cap from the tank or the replacing of the cap in said tank. The lower end of the dome part 6 of the cap is provided with openings 9 through which water may freely circulate; and the guide plate 8 is also perforated, as at 10, for a similar purpose. The normal level of the water in the tank 1 is indicated by the dotted line *a*. In the operation of generating gas, however, this water level is raised to the dotted line marked *b*, the pressure of the gas within the cap being usually sufficient to expel the water partly from the dome part and to cause it to rise in the main tank 1.

The gas is preferably generated from circular blocks of gas-producing material, preferably carbid made into a suitable composition and pressed into blocks of the proper size and contour. To support these blocks in the contracted part 7 of the cap an open skeleton frame support 11 is provided. This support consists of the downwardly diverging legs 12 which rest on the false bottom 2 of the tank and are inclosed within the dome part 6. These legs carry a ring 13 at their upper ends, said ring being slightly smaller in diameter than the interior of the contracted gas chamber 7 the upper edge of said ring being within the contracted part of the cap. From this ring rise two vertical rods 14 at diametrically opposite points on the ring said rods extending near to the top of the gas chamber and being connected by a cross bar 15. Two other rods 16 are connected to the ring 13 and extend upwardly within the gas chamber 7, their upper ends being connected together by a ring 17, these rods terminating below the cross bar 15, as shown clearly in Fig. 3. The ring 13 is provided with cross bars 18 which form a supporting surface for the blocks 19 of gas generating material. These blocks are preferably formed circular in horizontal section to fit within the cylindrical gas chamber 7 and are sufficiently large in diameter to fit snugly within the ring 13. Each cake or block is formed with a vertical recess 20 to adapt it to fit around the gas pipe 4, as indicated clearly in Fig. 5. The bar 15 forms a handle by means of which the cake holder may be readily removed from the tank 1 when the cap 5 has been removed. The gas chamber 7 is contracted as described and the gas generating cakes or blocks are made of a diameter to substantially fill the said chamber so that the gas storage space will be reduced to the minimum while at the same time the generating capacity of the apparatus will be considerable.

The gas storage and washing chamber 3 is provided with a safety or blow-off valve 21 which may be of any suitable construction. With a generator constructed as shown and described herein the pressure that it is possible to generate is very light and the use of a safety valve is practically unnecessary, but it may be employed as an extra precaution against the generation of excessive pressures. The washing and storage chamber is also provided with an outlet valve 22 by means of which air may be permitted to escape during the beginning of gas generation, and which may serve as a means for gaging the proper level of water in said chamber. The gas is led from said chamber through a pipe 23 which is provided with a valve 24. The main portion of the tank is provided with a clean-out valve 25 through which the water and sludge from the generating chamber may be removed.

A hinged strap 26 may be connected to the top of the tank and extended over the cap to removably lock the cap in place. This strap may be provided with any suitable latch for holding it temporarily locked, such as the staple and pivot bar 27.

The water for the storage and washing chamber 3 may be supplied through the pipe 4, when the cap 5 is removed, or it may be supplied in any other suitable manner, for instance, through the valve 22.

The operation of the device is manifest but may be briefly described as follows: A suitable number of cakes or blocks 19 of the chemical are placed in the holder and supported by the ring 13. The cap 5 is then placed over the holder, water being previously supplied to the washing chamber to the desired amount. Water or other gas generating liquid is then supplied to the main tank to bring the level thereof approximately to the line marked $a$. As the water rises to the lower cake on the ring 13 gas will be generated. The valve 22 is then opened to permit the escape of air from the washing chamber, and the gas will then rise in the gas chamber 7 and pass down through the pipe 4 into the gas washing and storage chamber. Of course, if desired air may be permitted to escape through the gas outlet pipe 23. As gas pressure is developed in the chamber 7 and storage chamber the water within the dome part of the cap will be pressed downwardly and the water forced through the apertures 9 up into the main tank. When the gas pressure is sufficient to force the water below the lower edge of the lower gas generating cake the generation of gas will cease. As soon, however, as the pressure is reduced in the gas chamber and in the storage chamber, water will again rise to the bottom of the lower cake on the holder. The pressure necessary to force the water away from the lower gas cake and thus stop the generation of gas may be regulated by the amount of water placed in the main tank. It is manifest that by raising the level of the water the amount of pressure necessary to force it below the lower cake and out of the dome part 12 will be increased, and by lowering the water level the said pressure need not be so great. If the outlet valve 24 is open and the gas is being utilized it will continue to generate in the cap 5 as fast as it is exhausted through the pipe 23 and the controlling valve 24. When, however, the valve is closed and the use of gas ceases the pressure will gradually increase in the gas chamber 7 and the dome part 6 until it forces the liquid below the lower gas cake. The generation of gas will, of course, thereupon cease and will not begin again until the pressure has been sufficiently reduced to permit the water to again rise in the cap 5 to the lower gas cake. As the gas generating material is arranged in a vertical series of blocks said blocks will be automatically fed downward as the lowermost one is disintegrated by the gas generating fluid.

It is manifest that a generator constructed and arranged as shown and described herein will be extremely cheap to manufacture and will be very simple in its operation. It is manifest that the parts of the apparatus may be very readily assembled for operation and may with equal facility be dismantled and separated for the purpose of cleaning or repairs. The cake holder or container may be charged with cakes before it is placed in the generator, or the gas generating cakes may be readily inserted within the holder while it is within the main tank.

The central contracted gas chamber 7 extends a considerable distance above the extreme water level in the tank so that it constitutes a handle part by which the cap may be manipulated. The gas cake holder also extends a considerable distance above the extreme water level of the main tank so that its upper end forms a handle by which it may be readily removed from the tank or inserted therein. The handle part of the cake holder and the upper end of the gas chamber 7 preferably project above the main tank so that they will be free from the water therein under all conditions. By forming the gas cakes with recesses 20 in their vertical surfaces to receive the gas pipe 4 said pipe forms a guiding means to assist in maintaining the cakes in horizontal position and insuring their proper feeding downwardly as the lowermost cake is disintegrated by the gas generating liquid.

It is manifest that as the gas pressure in the chamber 7 varies the amount of gas cake subjected to the action of the gas generating liquid will vary. In this way the gas will be generated in quantities sufficient to respond to the demand on the generator, that is to say when a small amount of gas is being used the pressure in the chamber will be maintained sufficiently to permit only a small portion of the lowermost cake to be submerged in the generating liquid. When, however, the consumption is considerable, the pressure will be sufficiently reduced in the chamber 7 to permit the water to rise therein and generate a sufficient amount of gas to supply the larger demand on the generator.

By forming the gas cake supporting surface substantially equal in diameter to the interior of the contracted part of the cap and so placing the said surface that it is within the lower end of said contracted part, the lowermost gas cake will form a substantial closure for said contracted part and the sides of the cakes will be close to the wall of the contracted part of the cap so that they will be protected thereby. By continuing the contracted part of the cap below the normal water level of the tank and to the bottom of the lowermost gas cake the sides of the cakes will be protected from any splashing or surging of the water in the tank during the operation of the generator. The water will not be able to attack the sides of the cakes unless the pressure in the gas chamber be so reduced as to permit the water to rise therein. The result of this is that the decomposition of the gas generating material takes place mainly on the bottom of the lowermost cake, the decomposed matter falling between the bars forming the cake supporting surface. It is also manifest that by supporting the cakes independently of the cap said cakes will be held stationary at all times and will not be agitated by the vibration of the cap. This is of advantage for the reason that if the cakes move in response to the movements or vibrations of the cap that portion of the lowermost cake submerged might be broken and decomposed more rapidly than was desired.

By extending the contracted part of the cap to the bottom of the lowermost cake said contracted part forms an efficient means for preventing any broken parts of the cakes falling into the tank. The space between the interior surface of the contracted part of the cap and the sides of the cake is so small that only very minute parts of a cake can fall therethrough into the water. This is desirable for obvious reasons.

Having thus fully described my invention, what I claim as new and desire to secure by Letters Patent is:

1. The combination with a tank, a removable cap extending near to the bottom thereof, said cap being formed with a portion of large diameter wholly below the normal water level of the tank and open at its lower end, and with a long comparatively narrow portion of approximately uniform diameter and extending upwardly from the top of the larger portion, said narrow portion being closed at its upper end and forming a gas space, and the lower end of said narrow portion being below the normal water level of the tank, a gas cake holding frame of uniform diameter fitting closely within the contracted part of the cap and having a gas cake supporting surface within said narrow part of the cap and formed with supporting legs extending to the bottom of the tank to support said holding frame independently of the cap, whereby when cakes are superposed upon said supporting surface within said cake frame they will substantially fill the narrow portion of the cap transversely thereof and will not be agitated by the vibration of the cap.

2. The combination with a tank, a removable cap extending to the bottom of said tank, said cap being formed with a portion of large diameter wholly below the normal water level of the tank and open at its lower end and with a long comparatively narrow portion extending upwardly from the top of the larger portion, said narrow portion being of uniform diameter throughout and closed at its upper end to form a gas space or chamber of small capacity, the lower end of said narrow portion being below the normal water level of the tank, a holder for a cake of gas generating material supported on the bottom of the tank and independently of the cap, the cake supporting surface thereof being substantially equal in diameter to the diameter of the contracted part of the cap and located within the lower end of said contracted portion below the normal water level of the tank, said supporting surface being perforated, whereby when a cake of gas generating material is placed on said supporting surface its lower surface will be within the contracted part of the cap and the sides thereof will be protected by the walls of said contracted part, said cake forming a substantial closure for the contracted portion of the cap and the decomposition thereof taking place mainly on the bottom of the cake.

In testimony whereof I hereunto affix my signature in the presence of two witnesses.

GEORGE CHRISTIANS.

Witnesses:
T. R. MILLER,
L. MAGUIRE.

Copies of this patent may be obtained for five cents each, by addressing the "Commissioner of Patents, Washington, D. C."